US011288002B2

(12) United States Patent
Vosshall et al.

(10) Patent No.: US 11,288,002 B2
(45) Date of Patent: Mar. 29, 2022

(54) SYSTEM AND METHOD FOR PROVIDING HIGH AVAILABILITY DATA

(71) Applicant: Amazon Technologies, Inc., Seattle, WA (US)

(72) Inventors: Peter Sven Vosshall, Bainbridge Island, WA (US); Giuseppe Decandia, Seattle, WA (US); Deniz Hastorun, Seattle, WA (US); Avinash Lakshman, Mercer Island, WA (US); Alex Pilchin, Seattle, WA (US); Ivan D. Rosero, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 38 days.

(21) Appl. No.: 14/981,370

(22) Filed: Dec. 28, 2015

(65) Prior Publication Data

US 2016/0110110 A1    Apr. 21, 2016

Related U.S. Application Data

(63) Continuation of application No. 12/767,759, filed on Apr. 26, 2010, now Pat. No. 9,223,841, which is a (Continued)

(51) Int. Cl.
*G06F 3/06* (2006.01)
*G06F 16/27* (2019.01)
(Continued)

(52) U.S. Cl.
CPC ............ *G06F 3/065* (2013.01); *G06F 3/0604* (2013.01); *G06F 3/0673* (2013.01); *G06F 16/27* (2019.01);
(Continued)

(58) Field of Classification Search
CPC .. G06F 11/2097; G06F 16/2365; G06F 16/27; G06F 16/219; G06F 16/2255;
(Continued)

(56) References Cited

U.S. PATENT DOCUMENTS 5,390,359 A * 2/1995 Damerau ............ G06F 16/9014
5,809,494 A * 9/1998 Nguyen ............... G06F 16/9014
(Continued)

FOREIGN PATENT DOCUMENTS

JP    2004-157793    6/2004
JP    2006-195744    7/2006
(Continued)

OTHER PUBLICATIONS

Bing Liu, "Sentiment Analysis and Subjectivity;" Department of Computer Science, University of Illinois at Chicago; To appear in Handbook of Natural Language Processing, Second Edition, (editors: N. Indurkhya and F. J. Damerau) (Year: 2010).*
(Continued)

*Primary Examiner* — Ashish Thomas
*Assistant Examiner* — Mellissa M. Ohba
(74) *Attorney, Agent, or Firm* — Robert C. Kowert; Kowert, Hood, Munyon, Rankin & Goetzel, P.C.

(57) ABSTRACT

A computer-implemented data processing system and method writes a first plurality of copies of a data set at a first plurality of hosts and reads a second plurality of copies of the data set at a second plurality of hosts. The first and second pluralities of copies may be overlapping and the first and second pluralities of hosts may be overlapping. A hashing function may be used to select the first and second pluralities of hosts. Version histories for each of the first copies of the data set may also be written at the first plurality of hosts and read at the second plurality of hosts. The version histories for the second copies of the data set may be
(Continued)

compared and causal between the second copies of the data set may be evaluated based on the version histories for the second copies of the data set.

17 Claims, 12 Drawing Sheets

Related U.S. Application Data continuation of application No. 11/394,648, filed on Mar. 31, 2006, now Pat. No. 7,707,136.

(51) Int. Cl.
 *G06F 11/20* (2006.01)
 *G06F 16/23* (2019.01)
(52) U.S. Cl.
 CPC ...... *G06F 11/2097* (2013.01); *G06F 16/2365* (2019.01)
(58) Field of Classification Search
 CPC ............. G06F 16/2455; G06F 2201/82; G06F 3/0604; G06F 3/065; G06F 3/0673
 See application file for complete search history.

(56) References Cited

U.S. PATENT DOCUMENTS

| | | | |
|---|---|---|---|
| 5,881,292 A | 3/1999 | Sigal et al. | |
| 5,924,096 A | 7/1999 | Draper et al. | |
| 5,974,238 A | 10/1999 | Chase, Jr. | |
| 6,047,323 A | 4/2000 | Krause | |
| 6,148,337 A | 11/2000 | Estberg et al. | |
| 6,434,662 B1 | 8/2002 | Greene et al. | |
| 6,434,681 B1* | 8/2002 | Armangau | G06F 11/1466 711/162 |
| 6,523,036 B1 | 2/2003 | Hickman et al. | |
| 6,597,700 B2 | 7/2003 | Golikeri et al. | |
| 6,748,559 B1 | 6/2004 | Pfister et al. | |
| 7,096,316 B1 | 8/2006 | Karr et al. | |
| 7,647,329 B1* | 1/2010 | Fischman | G06F 3/0607 707/999.1 |
| 7,707,136 B2 | 4/2010 | Vosshall et al. | |
| 7,716,180 B2* | 5/2010 | Vermeulen | H04L 67/1097 707/626 |
| 7,925,624 B2 | 4/2011 | Vosshall et al. | |
| 8,248,928 B1* | 8/2012 | Wang | H04L 47/125 370/230 |
| 8,266,122 B1 | 9/2012 | Newcombe et al. | |
| 8,719,225 B1* | 5/2014 | Rath | G06F 16/273 707/634 |
| 8,843,441 B1* | 9/2014 | Rath | G06F 16/273 707/614 |
| 8,930,312 B1* | 1/2015 | Rath | G06F 16/278 707/634 |
| 9,069,827 B1* | 6/2015 | Rath | G06F 11/2094 |
| 9,116,862 B1* | 8/2015 | Rath | G06F 11/1425 |
| 9,223,841 B2 | 12/2015 | Vosshall et al. | |
| 9,270,566 B2* | 2/2016 | Wang | H04L 67/1014 |
| 2003/0120647 A1* | 6/2003 | Aiken | G06F 16/951 |
| 2003/0163285 A1 | 8/2003 | Nakamura et al. | |
| 2004/0153576 A1 | 8/2004 | Hansmann et al. | |
| 2005/0108247 A1 | 5/2005 | Heinla et al. | |
| 2005/0120025 A1 | 6/2005 | Rodriguez et al. | |
| 2005/0240943 A1* | 10/2005 | Smith | G06F 9/465 719/328 |
| 2005/0267871 A1 | 12/2005 | Marchisio et al. | |
| 2005/0283489 A1* | 12/2005 | Shiozawa | G06F 16/10 |
| 2006/0031323 A1 | 2/2006 | Johnson | |
| 2006/0059165 A1* | 3/2006 | Bosloy | H04L 49/355 |
| 2006/0282618 A1* | 12/2006 | Thompson | G06F 12/0804 711/118 |
| 2007/0067373 A1 | 3/2007 | Higgins et al. | |
| 2007/0156842 A1* | 7/2007 | Vermeulen | G06F 17/30212 709/217 |
| 2007/0168967 A1 | 7/2007 | Chopra et al. | |
| 2007/0282915 A1 | 12/2007 | Vosshall et al. | |
| 2010/0076930 A1 | 3/2010 | Vosshall et al. | |
| 2012/0330954 A1* | 12/2012 | Sivasubramanian | G06F 16/278 707/737 |
| 2015/0046395 A1* | 2/2015 | Rath | G06F 16/273 707/623 |
| 2015/0363124 A1* | 12/2015 | Rath | G06F 11/2041 709/219 |

FOREIGN PATENT DOCUMENTS

| | | |
|---|---|---|
| WO | 2005/043323 | 5/2005 |
| WO | 2006/053580 | 5/2006 |

OTHER PUBLICATIONS

Predrag Knezevic, et al., "Highly Available DHTs: Keeping Data Consistency After Updates", Agents and Peer-to-Peer Computing Lectures Notes in Computer Science; Lecture Notes in Artificial Intelligence, Jan. 2006, pp. 1-11.

Gabriel Antoniu, et al., "JuxMem: An Adpative Supportive Platform for Data Sharing on the Grid", Proceedings Workshop on Adaptive Grid Middleware (AGRIDM 2003), Sep. 1, 2003, Retrieved from URL: https://hal.inria.fr/inria-00000978/document on Sep. 6, 2017, pp. 1-12.

\* cited by examiner

Preference List $P_L(k_1) = \{A, B, D, E, C\}$ $P_L(k_2) = \{B, D, E, C, A\}$

⋮

SYSTEM AND METHOD FOR PROVIDING HIGH AVAILABILITY DATA

This application is a continuation of U.S. patent application Ser. No. 12/767,759, filed Apr. 26, 2010, now U.S. Pat. No. 9,223,841, which is a continuation of U.S. patent application Ser. No. 11/394,648, filed Mar. 31, 2006, now U.S. Pat. No. 7,707,136, which is hereby incorporated by reference herein in its entirety.

BACKGROUND

Enterprise computing environments often need to access data relating to a particular business application. In order to avoid a single point of failure, data is often stored at multiple hosts at different locations (e.g., different locations within a given data center, different data centers, and so on). Thus, for example, if a particular data set becomes unavailable from one host (e.g., due to host failure, due to a network partition or other network failure, and so on), a client process may access the data at another host. The individual hosts may not be highly available, but the combination of the individual hosts provides a more highly available solution.

When storing the same data at multiple locations, a problem that is encountered is maintaining consistency between the various copies of the data. The state of the data set as it exists at one host may not be consistent with the state of the data set as it exists at the other host. For example, if a client process has made changes to a data set at one host, and the data set then becomes unavailable from that host, the changes that have been made in the copy of the data set at that host may be lost, at least temporarily. A recent version of the data set may be obtained from another host. However, if the Client process starts operating on the data set from the other host, a further problem arises in that two versions of the data set may potentially be created, each with changes that are not reflected in the other data set.

Accordingly, an on-going need exists for systems and methods that are capable of providing highly available data. It should be appreciated that, although certain features and advantages are discussed, the teachings herein may also be applied to achieve systems and methods that do not necessarily achieve any of these features and advantages.

SUMMARY

An exemplary embodiment relates to a computer-implemented data processing method comprising writing a first plurality of copies of a data set at a first plurality of hosts and reading a second plurality of copies of the data set at a second plurality of hosts. In an exemplary embodiment, an arrangement is used for writing and reading the data set in which the first and second pluralities of hosts need not be entirely overlapping. In another exemplary embodiment, version histories are also written and read at the hosts and are used to evaluate causal relationships between the data sets after the reading occurs. In another exemplary embodiment, a hashing arrangement is used to select the hosts where the writing and reading of the data sets occurs.

It should be understood that the detailed description and specific examples, while indicating preferred embodiments of the present invention, are given by way of illustration and not limitation. Many modifications and changes within the scope of the present invention may be made without departing from the spirit thereof, and the invention includes all such modifications.

DETAILED DESCRIPTION OF THE EXEMPLARY EMBODIMENTS

I. System Architecture of Exemplary System

Figure 1:
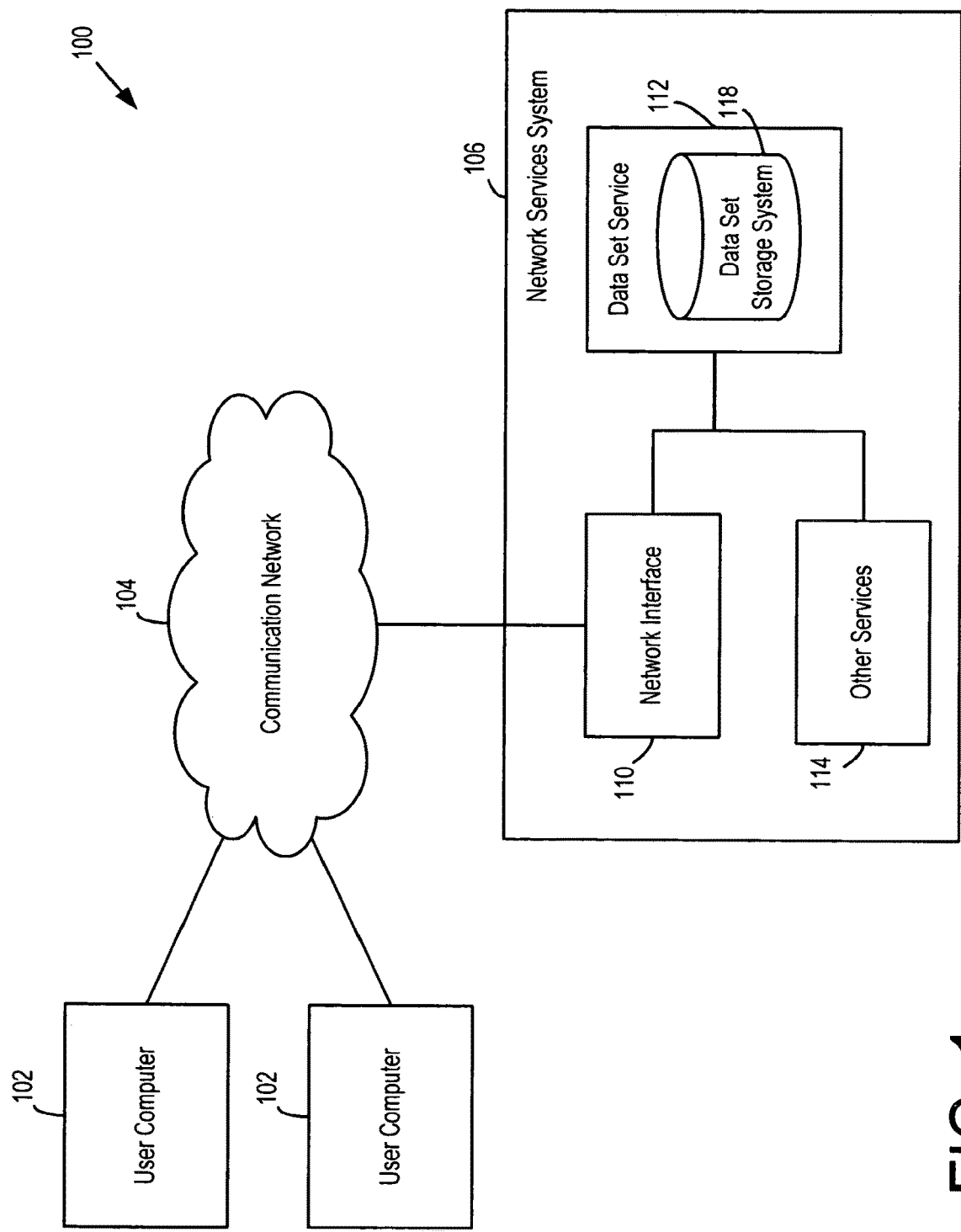
FIG. 1 is a block diagram of a data processing system according an exemplary embodiment.

Referring to FIG. 1, a data processing system 100 according to an exemplary embodiment is shown. Data processing system 100 includes user computers 102, communication network 104, and a network services system 106. User computers 102 may access network services system 106 via communication network 104. Network services system 106 includes network interface 110, a data set service 112, and one or more other services 114. The network interface 110 receives data from and provides data to the user via communication network 104. For example, the network interface 110 may provide the users computers 102 with access to data sets maintained by the data set service 112 as well as to other data generated and/or maintained by the other services 114.

Data set service includes a data storage system 118 which may store the data sets. The data states may change over time based on user interaction and/or based on other changes in system 106. Herein, the term "data set" refers to any data that may change over time. For example, each data set may include one or more items that may be added, removed, and/or modified from the data set. Data storage system 118 is configured to store information in a highly available manner so that, in the event of a system fault (e.g. host failure, network failure, and so on), the data sets remain available with a high level of consistency, as discussed below. In an exemplary embodiment, the data storage system 118 is implemented using a Berkeley database transaction data storage system.

Figure 2:
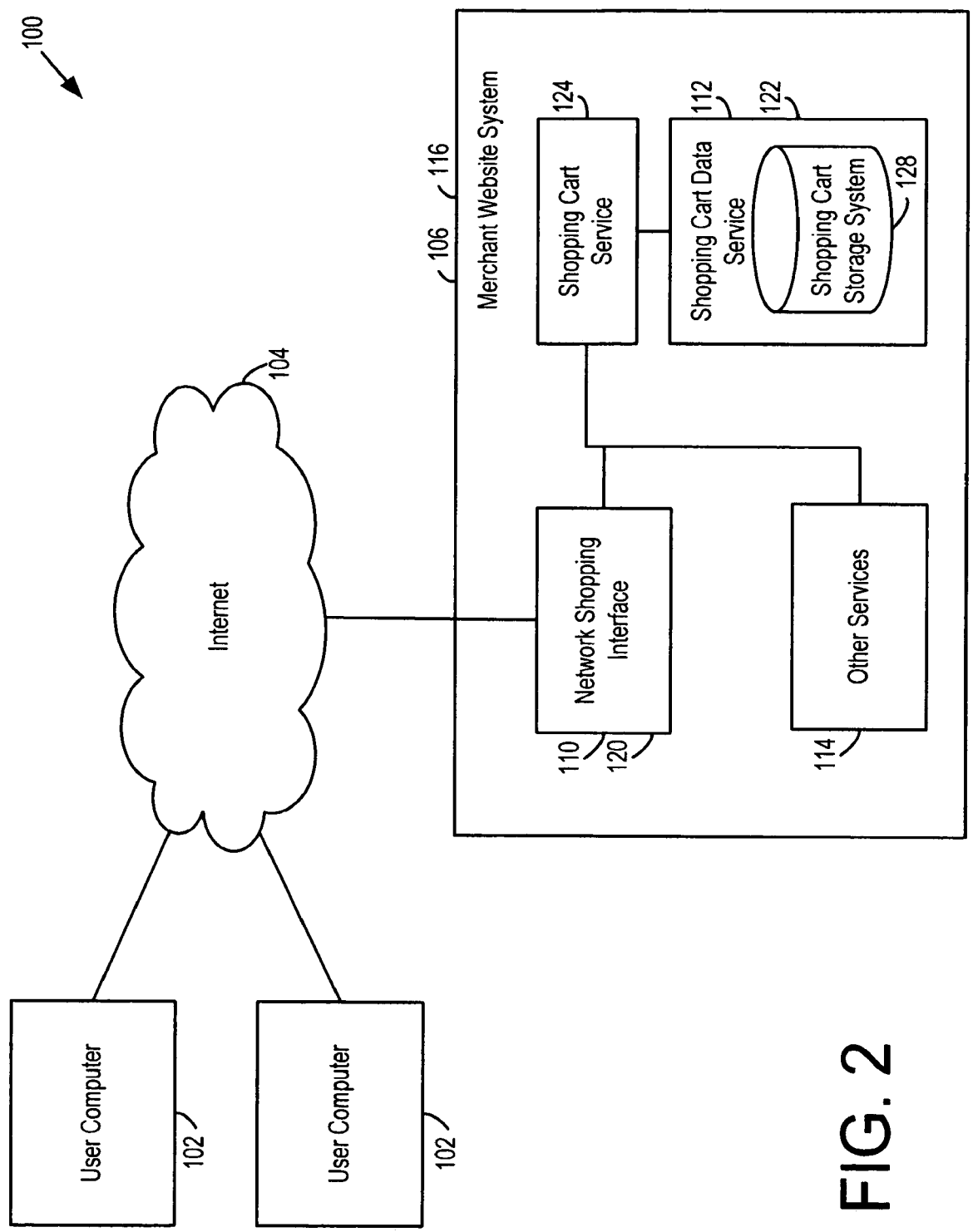
FIG. 2 is a block diagram of another data processing system according an exemplary embodiment.

Referring now also to FIG. 2, FIG. 2 provides another example of a data processing system 100. In the example of FIG. 2, network services system 106 is a merchant website system 116 and the network interface 110 is a network shopping interface 120. Merchant website system 116 may, for example, be implemented in a distributed computing environment comprising thousands of hosts or more. Merchant website system 116 may provide a merchant website (e.g., an on-line retail website) accessible to a user operating a user computer 102 to shop for items (e.g., goods, services, subscriptions, etc.). In such an embodiment, network shopping interface 120 may provide users with graphical and/or text data on the website to facilitate the display and/or sale of items. The data provided to users may include item information such as pricing, dimensions, availability, items currently selected for purchase, and so on. Merchant shopping interface 120 may also be configured to receive data from user, such as data indicating items the user is interested in, data needed to complete a transaction, and so forth.

In the example of FIG. 2, data set service 112 is shown to be a shopping cart data service 122 that maintains lists of items selected for purchase or possible purchase by users of the website. In such an example, each data set may be a shopping cart related to a specific customer. The data set may include item identification information for items in the shopping cart, item information for items that a user may have selected but not yet purchased, quantity information of items in the shopping cart, and so on. The shopping cart data service 122 may be accessed through a shopping cart service 124, which may comprise other business logic associated with shopping carts. The website system 116 may publish web pages for users of the website that include all or a portion of the data set, e.g., a webpage showing all or a portion of a user's shopping cart. In other example embodiments, the data sets may comprise other data that may be collected by website system 116, based on the interaction of a user, or for the convenience of the visitor or to facilitate operation of the website. For example, the data set service 112 may also maintain data sets relating to specific entities (e.g., data sets relating to different users of a website, different sessions on the website, different transactions conducted on the website, different items offered by the website, different categories of items offered by the website, different advertisements published on the website, different pages of the website, and so on). As will also be appreciated, although FIG. 2 shows a website system, the data processing system 100 may be used in other applications.

Referring again to FIG. 1, data set service 112 may be used both in connection with local processes and remote processes. In the context of remote processes, read and write requests for data set service 112 may be received from a remote process by way of communication network 104. For example, the network services system 106 may offer services that are accessible to remote processes through an application programming interface (API) across the Internet.

Such service requests may be made by third parties, for example, to assist in the operation of their own data processing systems.

Figure 3:
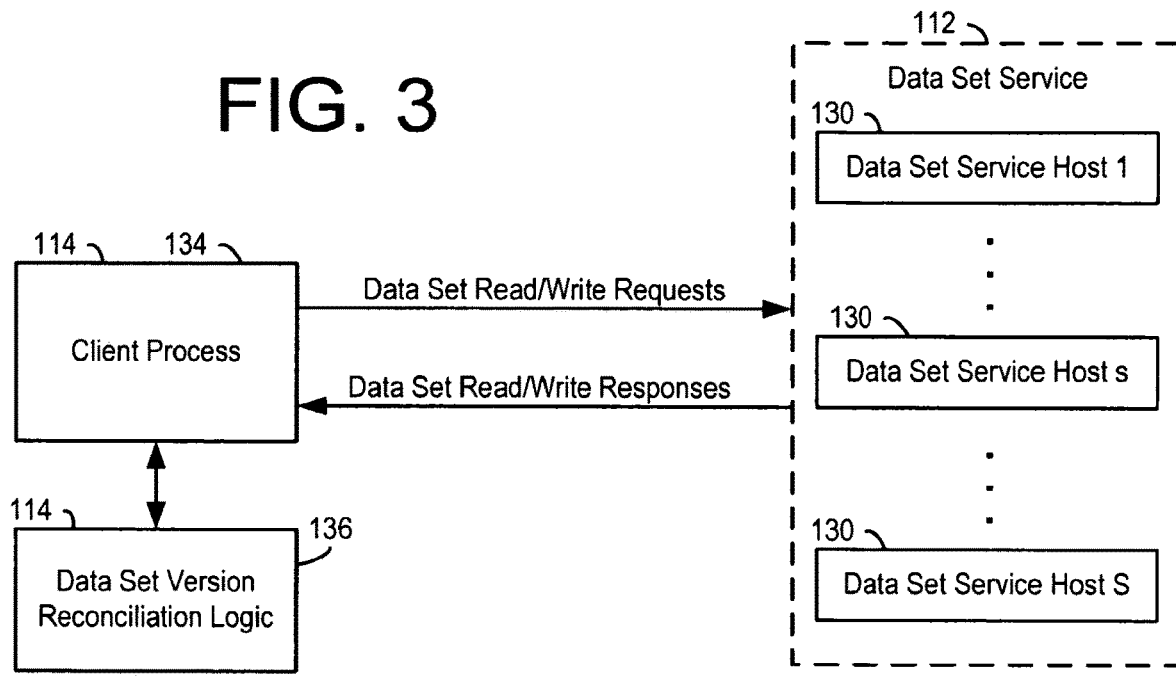
FIG. 3 is a block diagram showing a data set service of FIG. 1 in greater detail according to an exemplary embodiment.

Referring now to FIGS. 3-6, construction and operation of the data set service 112 is shown in greater detail. As shown in FIG. 3, the data set service 112 may comprise a plurality of hosts 130. Herein, the term "plurality" means two or more. For example, the data set service 112 may comprise tens, hundreds, or thousands of hosts 130 or more. In an exemplary embodiment, each host 130 is functionally equivalent (e.g., executes the same code, or executes related versions of the same code). As will be described below, the data set storage system 118 may be distributed across the hosts 130, such that each host 130 stores a portion of the data sets. Each host 130 stores a subset of the data (of the key-value pairs) and the system attempts to maintain N replicas of each data set (where N is a positive integer representing the replication factor or the number of times to replicate the data set). The value N is configurable and affects both the durability, availability and consistency of data. If there are S physical hosts in the system, then the overall system 106 comprises S≥N physical hosts (although the smaller S, the lower the total system availability), and each host 130 stores approximately N/S of the data sets. Alternatively, if heterogeneous hosts 130 are used, then each host 130 stores a number of data sets which is proportional to the weight of the respective host 130 weight in the system 106. The weight of each host 130 may be determined based on the resources of each host 130. For example, the weight of each host 130 may be determined based on the relative power of each host 130 (e.g., as determined based on processing capacity, storage capacity, and/or network capacity), such that more powerful hosts 130 may store more data sets. The value of N may also be made configurable on a per data set or per data type basis, for example, to permit availability/durability to be configured on a per data set or per data type basis.

Figure 4:
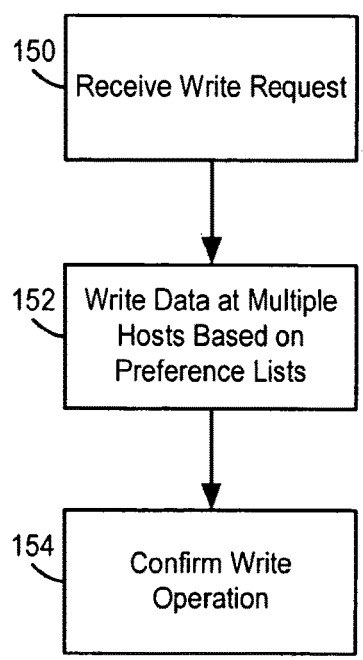
FIG. 4 is a flowchart of a write operation implemented by the system of FIG. 1 according to an exemplary embodiment.

As shown in FIG. 4, to store data received from a client process 134 (e.g., one of the services 114), the data set service 112 receives a write request from the client process 134 (step 150) and then responds by writing the data at multiple hosts 130 (step 152). (For purposes of this application, the term "client process" refers to any program logic that may request data sets from any other program logic, e.g., herein, from the data set service 112.) In an exemplary embodiment, the data is written at multiple hosts 130 based on preference lists, as described below. After the data is written, a response is sent to the client process 134 confirming that the write operation has been performed (step 154). Exemplary write operations are described in greater detail in connection with FIGS. 7-12, FIGS. 13A-13B, and FIGS. 14A-14B.

Figure 5:
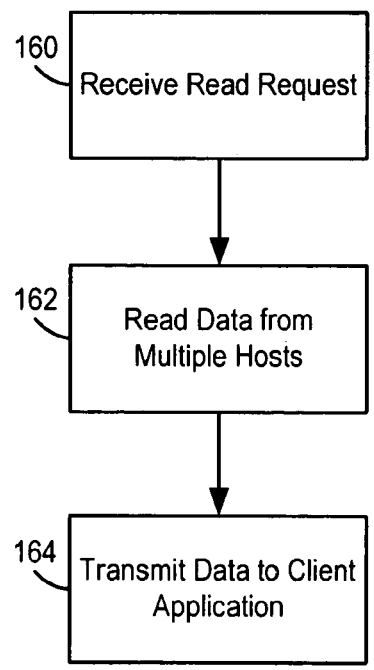
FIG. 5 is a flowchart of a read operation implemented by the system of FIG. 1 according to an exemplary embodiment.

As shown in FIG. 5, to provide data to a client process 134, the data set service 112 receives a read request from the client process 134 (step 160) and then responds by reading the data at multiple hosts 130 (step 162). After the data is read, a response is sent to the client process 134 confirming that the read operation has been performed and including the requested data (step 164). Exemplary read operations are described in greater detail in connection with FIGS. 15A-15B.

Figure 6:
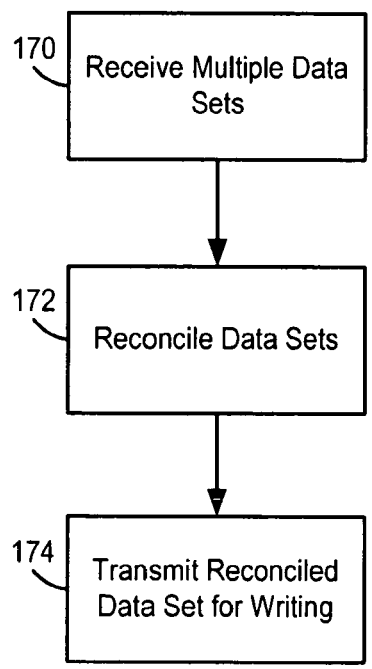
FIG. 6 is a flowchart of a data reconciliation and update operation implemented by the system of FIG. 1 according to an exemplary embodiment.

With regard to FIG. 6, when all relevant network connections and hosts 130 are healthy (e.g., available and responsive), the hosts 130 involved in the read operation typically provide consistent data. However, when one or more of the network connections or hosts 130 is troubled or failed, the hosts 130 may provide different versions of the same data set. Thus, as shown in FIG. 6, after the data sets are received at the client process (step 170), the data sets may be reconciled (step 172). The reconciled data set may then be transmitted to the data service 112 for storage (step 174). As described in greater detail below, the existence of inconsistent versions of the same data set may be detected using a data versioning arrangement. The data versioning arrangement may also be used by version reconciliation logic 136 (provided as part of or in connection with client process 134, as shown in FIG. 3) to reconcile the inconsistent versions. An exemplary data versioning arrangement is described in greater detail below in connection with FIG. 16.

II. Coordination of Read/Write Operations in Exemplary System

A. Partitioning Data Sets Over Hosts

Figure 7:
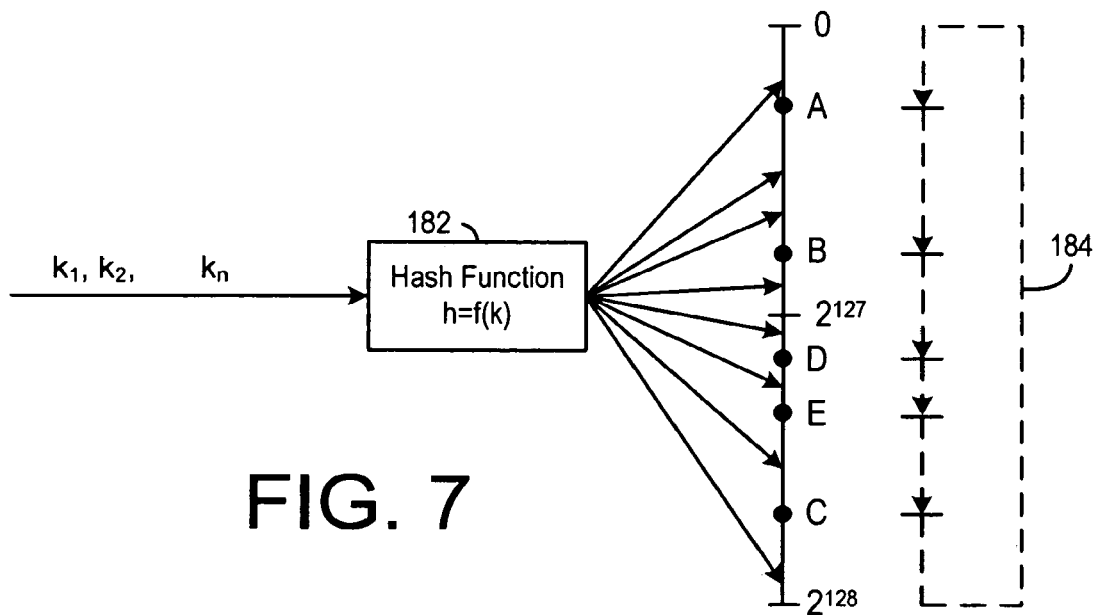
FIG. 7 is a diagram of a hash operation used in connection with data replication and load balancing in the system of FIG. 1 according to an exemplary embodiment.
Figure 8:
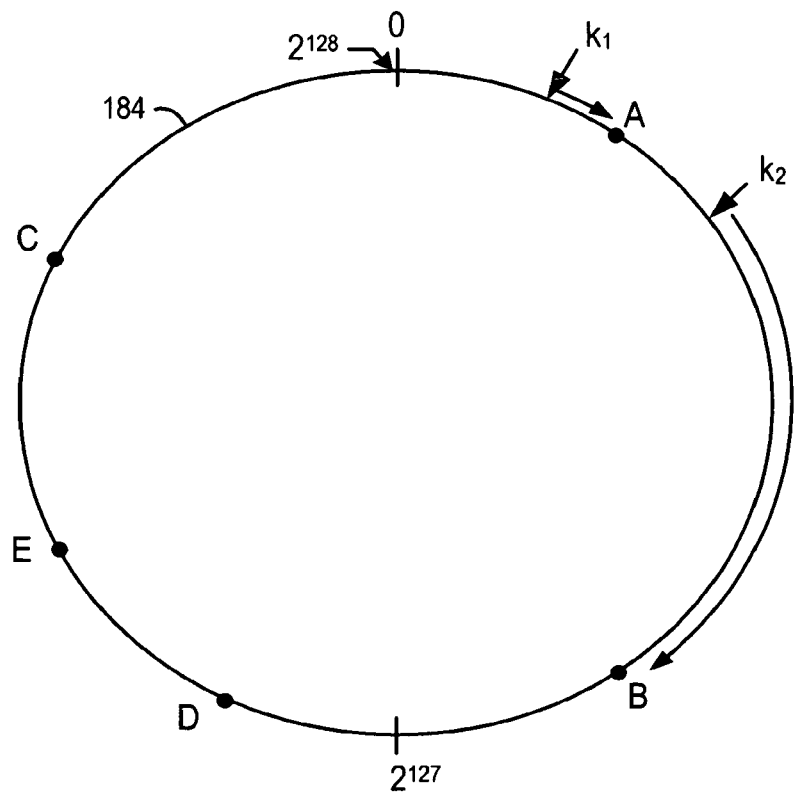
FIG. 8 is another diagram of the hash operation shown in FIG. 7 according to an exemplary embodiment.

Referring to FIGS. 7-8, in an exemplary embodiment, data set service 112 includes a mechanism to partition data sets over hosts 130 in system 106. In an exemplary embodiment, described below, a consistent hashing arrangement may be used to store data sets such that data is spread relatively evenly over the hosts 130. In other embodiments, other data partitioning arrangements may be used.

Referring first to FIG. 7, in an exemplary embodiment, in order to access the data stored by the data set service 112 (e.g., via a read operation or a write operation), client processes transmit data requests that include a key for the data set to which each request refers. For example, in the context of a shopping cart application, the key may be generated based on the user ID of the user to whom the shopping cart is related (e.g., the user ID may be used as the key). The keys may be any data value that is associated with a data set and that is suitable for use as an input to a hash function. As shown in FIG. 7, the key is applied to hash function 182 which in turn generates a hash value h as a function of the key. In an exemplary embodiment, the hash function 182 achieves an approximately uniform spread of hash values over a hash range. In the illustrated embodiment, the values are shown to be spread over the hash range $\{0, 2^{128}\}$, however, any number of hash values, or effectively any size hash range, may be used.

Upon becoming active participants in the data set service 112, each host 130 is assigned a set of positions over the hash range. For purposes of explanation, it is assumed in the remainder of the discussion herein that there are five hosts 130 which implement the data set service 112, shown as host A, host B, host C, host D and host E. It will be appreciated that, in practice, data set service 112 may be implemented by tens, hundreds, or thousands of hosts 130 or more.

Referring to FIG. 8, FIG. 8 shows the manner in which responsibility for a read operation or a write operation is assigned to a particular host 130 based on a hash value. Each host 130 is responsible for read/write operations in connection with hash values extending from its own position in the hash range to the position of the previous host 130. For example, if hosts A, B, C, D and E are positioned at hash values $h_1$, $h_2$, $h_3$, $h_4$, and $h_5$, respectively, then host B is responsible for the range of hash values $h_1<h \leq h_2$, host C is responsible for the range of hash values $h_2<h \leq h_3$, and so on. The assignment of responsibility "wraps around" for host A, that is, host A is responsible for the range of hash values $h_5<h \leq 2^{128}$ and $0 \leq h \leq h_1$ In operation, for example, data sets with keys $k_1$ and $k_2$ are assigned to hosts 130 by hashing the keys $k_1$ and $k_2$ to yield their position on ring 184, and then walking ring 184 clockwise to find the first host 130 with a position larger than the hashed key of the data set. In the case of key $k_1$, the first host with a larger position, which the corresponding data set is assigned to, is host A. In the case of key $k_2$, the first host with a larger position, which the corresponding data set is assigned to, is host B.

Figure 9:
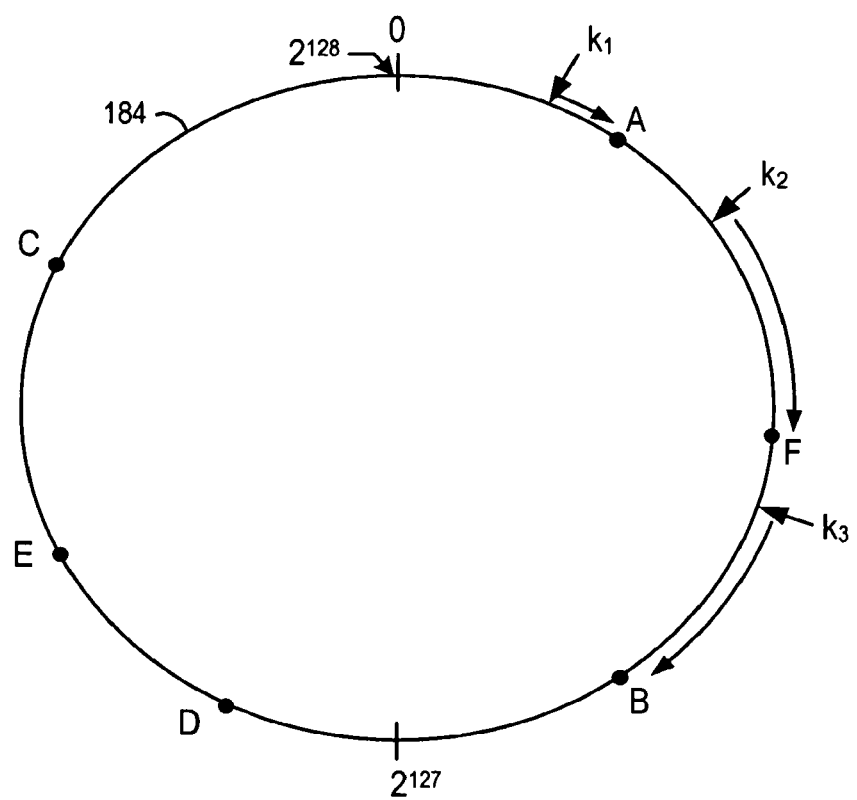
FIG. 9 is a diagram showing incremental scalability features of the system of FIG. 1 according to an exemplary embodiment.

The arrangement shown in FIGS. 7-8 results in each host 130 being responsible for the region of the ring 184 between it and its predecessor host 130 on the ring 184. For example, host B is responsible for the portion of the ring 184 between it and host A. If a host 130 enters or leaves, it only affects the responsibilities of its immediate successor on the ring 184; all other hosts 130 are unaffected. This is shown in FIG. 9, in which the addition of a host F impacts the responsibilities of its immediate successor on the ring 184, host B, but not the responsibilities of other hosts 130, such as host A. Thus, individual hosts 130 may be added or removed without a total remapping of the partitioning of data sets to hosts 130, thereby promoting incremental scalability.

1. Data Replication

Figures 10, 11:
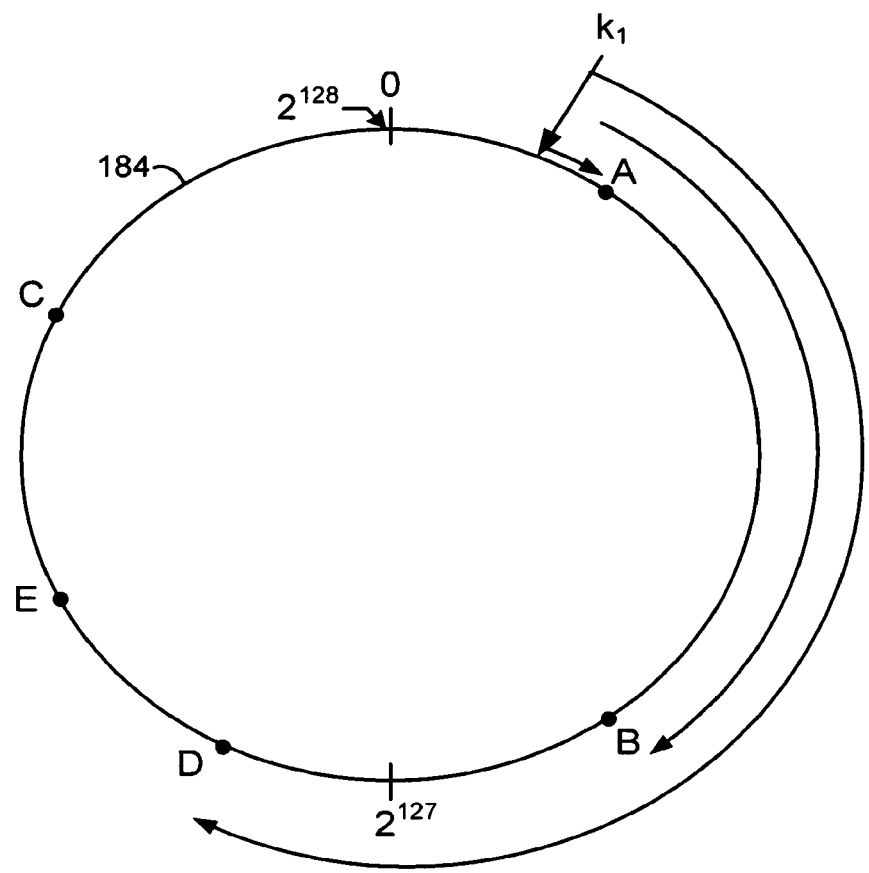
FIG. 10 is a diagram of a data replication arrangement used in the system of FIG. 1 according to an exemplary embodiment.
FIG. 11 is a diagram of a host preference list used in the system of FIG. 1 according to an exemplary embodiment.

Referring now to FIGS. 10-11, the hashing arrangement of FIGS. 7-8 may be used to support data replication. In FIG. 10, rather than the data set being assigned merely to the immediate successor host 130 on the ring 184, the data set is assigned to the first N successor hosts 130. As described below, data set service 112 may operate to ensure that there are N replicas of the data among the hosts 130, and each host 130 is responsible for the region of the ring 184 between itself and its Nth predecessor.

As shown in FIG. 11, in such an arrangement, each key has a preference list 190 of hosts 130, which is the order that each of the hosts 130 is first encountered while moving clockwise around the ring 184 from the hash value generated based on the key. The preference list 190 represents the preferred order of hosts 130 used for accessing (e.g., reading or writing) a data set. When all hosts 130 are healthy, the top N hosts in the preference list 190 store the data set. If a particular host 130 happens to fail, or if there is a network partition, the data set may temporarily be stored at a host 130 that is lower ranked in the preference list 190. If multiple hosts 130 fail, then the data set may be stored at multiple lower ranked hosts 130 in the preference list 190. With N=3, a client process 134 accessing a data set associated with key $k_1$ reads or writes to hosts A, B, and D (and then E and then C, if any earlier hosts are unavailable) in that order, as can be seen by moving clockwise around ring 184 from the position of key $k_1$. A client process 134 accessing a data set associated with key $k_2$ reads or writes to hosts B, D, E, (and then C and then A, if any earlier hosts are unavailable) in that order, as can be seen by moving clockwise around ring 184 from the hash position of key $k_2$. As indicated above, the value N is a configurable value; thus, more hosts 130 may be added to system 106 to permit more replication of data sets. Accordingly, the level of availability of data sets is configurable and may be made as high as desired using the appropriate number of hosts 130.

When all hosts 130 are available, successive operations on the same data set access the same set of N hosts, and are therefore consistent (i.e. an operation accesses the same data that was read/written by the previous operation on the same key). When there are network or host failures, successive operations to the same data set may access different sets of hosts 130; however, the operations may still be consistent as long as there is some overlap in the sets of hosts that are accessed. For example, a first operation on key $k_1$ may access hosts A, B, and D. Later, if host B is unavailable, a second operation on $k_1$ may access hosts A, D, and E. Thus, by accessing available hosts 130 that are highest in the preference list 190, minor changes in the availability of hosts from operation to operation do not negatively affect consistency because subsequent accesses may involve overlapping hosts. The availability of at least N hosts must change during two successive operations in order for there to be no overlap between the host sets (resulting in an inconsistency). As indicated above, the value N is a configurable value; accordingly, a probabilistic guarantee of consistency is configurable and may be made as high as desired. This includes probabilistic guarantees of both global consistency (the system response reflects the absolute latest change made to the data) and subjective consistency (the system's response reflects the latest changes made by the client making the current request).

In an exemplary embodiment, client operations on data sets may be serviced at multiple locations (e.g., servers). Furthermore, successive operations on the same data set may be serviced by different servers. In an exemplary embodiment, in order to access the hosts 130 that store a given data set, a server stores information regarding the host positions in the hash space (in order to compute the preference list 190) as well as the availability of hosts 130 (in order to select the N available hosts that are highest in the preference list 190). In the presence of network or host failures, different servers may store different information regarding the availability of hosts. In the presence of hosts joining or leaving the system, different servers may store different information regarding the set positions in the hash space. For example, server X may not be aware that host A has joined the data set service 112. Hence, in servicing an operation on a data set with key $k_1$, server X may access hosts B, D, and E. Another server Y may already be aware of both host A and the hash positions of host A. Based on this information, when servicing a subsequent operation on key $k_1$, server Y may access hosts A, B, and D. Thus, by accessing available hosts 130 that are highest in the preference list 190, the probability of accessing at least one host during write and read operations is increased. Accordingly, minor differences in information regarding host availability and hash positions from server to server do not negatively impact consistency during successive operations. As indicated above, this probabilistic guarantee of consistency is determined by the value of N.

In an exemplary embodiment, the preference list 190 may be implemented by way of operation of hashing function 182 (e.g., without being separately stored). In another exemplary embodiment, the preference list 190 may be stored. As will be appreciated, other factors may be taken into account when constructing the preference list 190. The preference list 190 may be manually or automatically constructed to take into account such factors. For example, in order to further improve availability and durability, preference list 190 may be constructed so as to include hosts 130 in the same preference list 190 which have a relatively low probability of correlated failure. For example, if system 100 is distributed over multiple networks, there may be sets of hosts 130 that are unlikely to fail together. Hence, system 100 can maximize availability and durability by choosing the N hosts for the N replicas of a data set such that they have low correlated failures. Likewise, low failure correlation may also exist where hosts 130 are running on different hardware, using different program logic implementations, running in geographically diverse areas, and combinations thereof. For example, when moving clockwise around ring 184, a set of rules may be applied to assess whether an encountered host 130 meets any additional criteria that are desired to be considered. If the encountered host 130 does not meet the additional criteria, the search for an available host may continue onward around ring 184 until a host is encountered that does meet the additional criteria.

Other arrangements may also be used to achieve geographic diversity. For example, rather than using a single ring 184, a tiered ring arrangement may be used. For example, a two-tiered or ring of rings arrangement may be used, in which multiple bottom level rings 184 each have a position on a top level ring, and each have responsibility for a range of hash values on the top level ring, akin to the manner in which hosts 130 each have responsibility for a range of hash values on the ring 184, as described above. Each bottom level ring may, for example, correspond to a set of hosts 130 located a different geographic location. Within the set of hosts 130 at each location, each host 130 may be assigned responsibility for a range of hash values on the respective bottom level ring. As will be appreciated, more than two tiers of rings may also be used (e.g., additional levels of rings may be used to specify areas within a data center, particular racks of hosts within a data center, and so on).

2. Load Balancing

Figure 12:
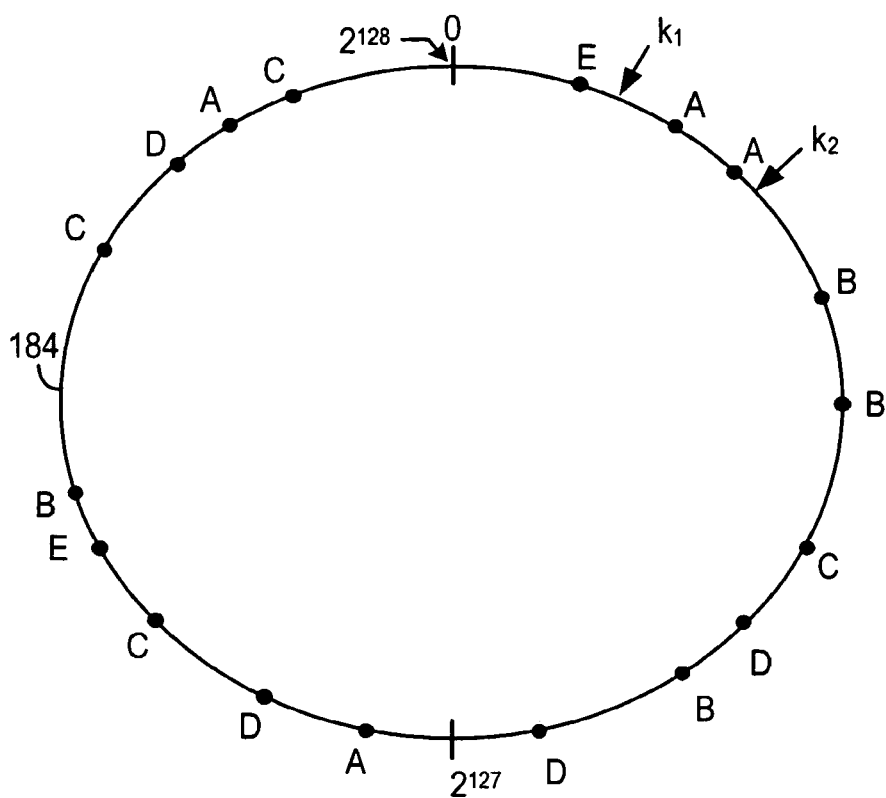
FIG. 12 is a diagram of a load balancing arrangement used in the system of FIG. 1 according to an exemplary embodiment.

Referring to FIG. 12, the hosts 130 may be assigned to multiple positions on the ring 184 in order to promote load balancing, that is, to avoid non-uniform data and load distribution that may otherwise be created by a random position assignment of each host 130 on ring 184. Thus, in FIG. 12, hosts A, B, C, D, and E are assigned multiple positions on ring 184. This multiple positioning tends to reduce the variance in the number of data sets assigned to each host 130, because the increased number of random placements on ring 184 tends to cause the number of data sets assigned to each host 130 to converge on an average value. Thus, assigning more positions to each host 130 on the ring 184 improves load balancing. In an exemplary embodiment, only the first instance of each encountered host 130 is placed in the preference list 190. In the case of key $k_1$, the first host with a larger position, which the corresponding data set is assigned to, is host A. With N=4, a process accessing a data set associated with key $k_1$ reads or writes to hosts A, B, C, and D. The preference list 190 for key $k_1$ is different than above due to the hosts having multiple positions on ring 184 and due to the hosts being encountered in a different order. In the case of key $k_2$, the first host with a larger position, which the corresponding data set is assigned to, is host B. A client process 134 accessing a data set associated with key $k_2$ reads or writes to hosts B, C, D, and A, in that order. In other example embodiments, multiple instances of each encountered host 130 may be placed in the preference list 190, e.g., in order to retry a host 130 that was previously unavailable.

Assigning hosts 130 multiple positions on ring 184 also facilitates usage of heterogeneous hardware, that is, more powerful hosts 130 may be assigned more positions on ring 184 and less powerful hosts 130 may be assigned fewer positions on ring 184. For example, in FIG. 12 host E has fewer positions than any other host, and thus is assumed to be a less powerful host. As will be appreciated, a range of hosts may be used, each being more or less powerful than other hosts 130. The number of positions assigned to a particular host. 130 may be a function of the relative power of the particular host 130.

Additionally, if a sufficient number of positions assigned to each host 130, then each host 130 may have a successor/predecessor relationship with each of the other hosts 130. Accordingly, if one of the hosts 130 becomes unavailable, or is decommissioned, the load handled by the decommissioned host 130 may be approximately evenly dispersed across the remaining available hosts 130 without losing data availability. Likewise, when a host 130 becomes available again, or a new host 130 is added to data set service 112, the newly available host 130 may offload a roughly equivalent amount of load from each of the other available hosts 130.

B. Read/Write Access Operations

Referring now to FIGS. 13A-13B, 14A-14B, and 15A-15B, exemplary read and write operations are shown. The read/write operations may be invoked by a service request made to data set service 112 by client processes 134. Upon receiving the service request, the data set service 112 performs the requested operation and provides a response to the client process 134.

At data set service 112, one of the hosts 130 is responsible for coordinating the read or write request. The host 130 responsible for coordinating the read or write request is referred to herein as the coordinator. In an exemplary embodiment, the coordinator is the first host 130 listed in the preference list 190, and coordinating the read or write request includes performing a local read or write operation. For example, the service request may initially be received by another host 130, and that host 130 may make a decision to forward the service request to the host 130 which serves as the coordinator (e.g., the top host in the preference list 190). In another exemplary embodiment, the coordinator may be another host 130, such as a host 130 that is not on the preference list 190, and coordinating the read or write request does not include performing a local read or write operation. For example, the coordinator may be a host 130 which happens to initially receive the read or write request, but which does not happen to be near the top of the preference list 190, and which does not make a decision to forward the service request to a host which is near the top of the preference list 190. For purposes of providing an example, it is assumed herein that the coordinator is the first host 130 listed in the preference list 190.

In an exemplary embodiment, as described above, read and write operations may access the first N healthy hosts in preference list 190, skipping over hosts 130 that are potentially down or inaccessible. When all hosts 130 are healthy, the top N hosts 130 in the preference list 190 of a key may be accessed. When there are host failures or network partitions, hosts 130 that are further down in the preference list 190 may be accessed instead, thereby maintaining high availability.

Figure 13A:
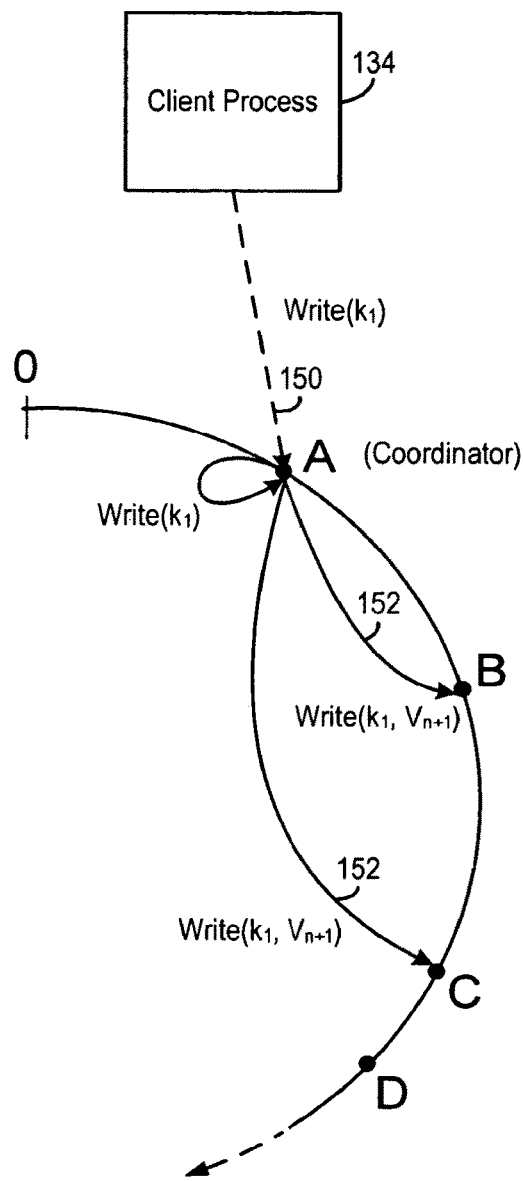
FIGS. 13A-13B are flowcharts of a write operation implemented by the system of FIG. 1 according to an exemplary embodiment.
Figure 13B:
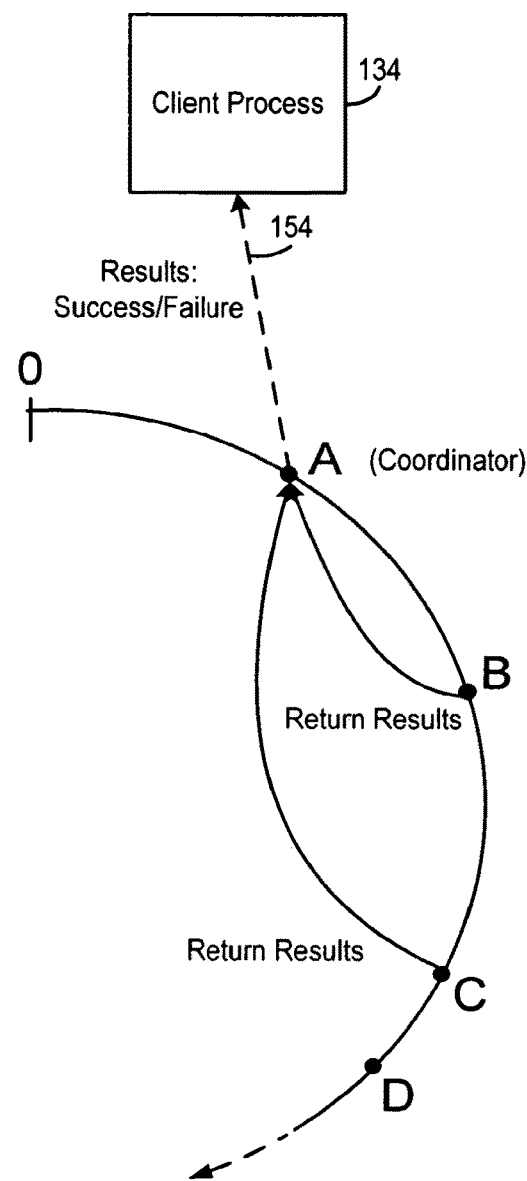

Referring first to FIGS. 13A-13B, an example write operation is shown. In FIG. 13A, a write request for version Vn+1 is received by host A from client process 134 (either directly or indirectly, as described above). Assuming the distribution of hosts 130 on ring 184 as shown in FIG. 12, then the preference list 190 for key $k_1$ is $P_L=\{A, B, C, D, E\}$. Host A is the coordinator and, in this example, performs the write operation locally (step 150). Host A then copies the new version Vn+1 to the remaining N−1 highest-ranked reachable hosts, hosts B and C (e.g., if N=3), which then also perform the write operation and store additional copies (step 152).

When the data set is stored, in addition to the data itself, the key associated with the data and a vector clock are also stored. The key permits the data set to be identified later. The vector clock is used for data versioning to capture causality relations between different versions of the same data set and comprises a list of {host ID, counter} pairs associated with the versions of data sets. Data versioning through the use of vector clocks is discussed in greater detail below in connection with FIG. 16.

In FIG. 13B, hosts B and C report back to host A whether the write operation was successful, and host A responds to client process 134 confirming whether the write operation was successful (step 154). In exemplary embodiment, in order for a write operation to be considered successful, the write operation must be successful at W hosts, where W is a configurable value and W≤N. Thus, for example, if N=3 and W=2, a write operation is considered successful if it is successful at two hosts 130, even if the write operation was attempted at three hosts 130. It may be noted that, if the write operation is successful one or more of the hosts 130, copies of the data set may still eventually migrate to the top N hosts in the preference lists 190, as described in greater detail below. Thus, even if a write operation is not considered successful according to the test set forth above, eventual consistency of the data set at the top N hosts may still be achieved.

Figure 14A:
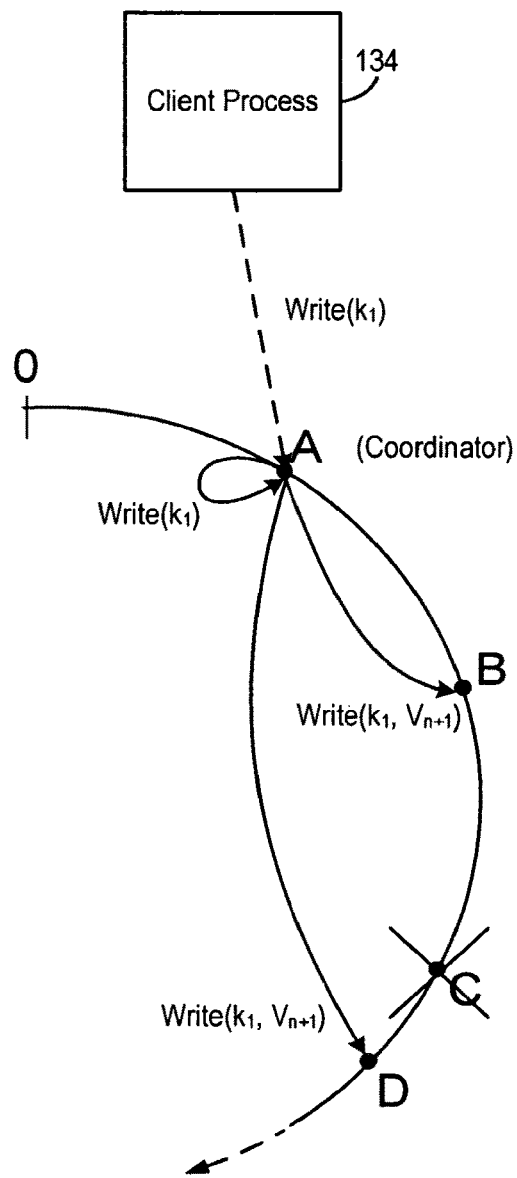
FIGS. 14A-14B are flowcharts of a write operation including a hand-off operation implemented by the system of FIG. 1 according to an exemplary embodiment.
Figure 14B:
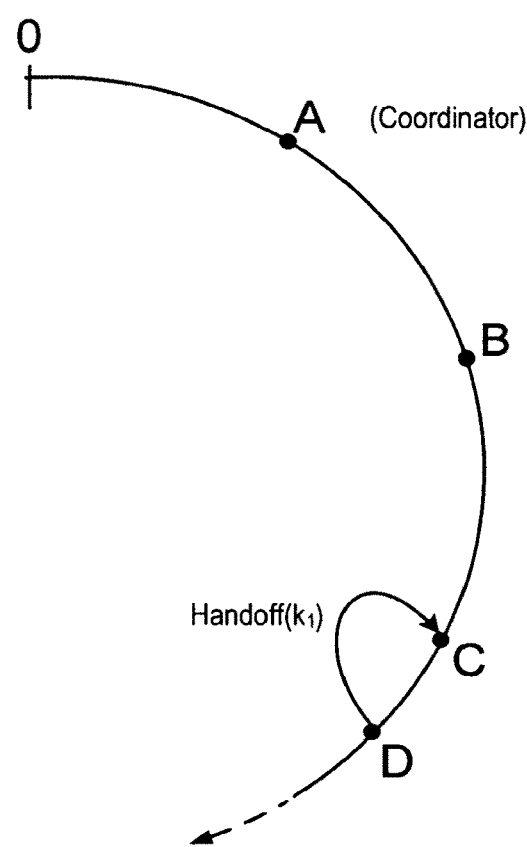

Referring to FIGS. 14A-14B, an example write operation with data hand-off is shown. Data hand-off is a mechanism that attempts to migrate data to the N highest-ranked hosts in the preference list 190 for a data set. For example, as described above, in general, the coordinator attempts to send the data to the top N hosts in the preference list 190. However, if one or more of the hosts 130 is down, the coordinator sends the data to hosts 130 further down the preference list 190. The preference list 190 provides a well defined sequence of hosts 130 that will participate in write operations (and in read operations), and the data hand-off mechanism is used to migrate the data back to the N highest-ranked hosts 130 in the preference list 190.

Thus, as shown in FIG. 14A, host A receives a write request for version Vn+1 as in FIG. 13A. Host A then performs the write operation and attempts to copy the new version to the remaining N highest-ranked reachable hosts, hosts B and C. In the illustrated example, host C has temporarily failed, and thus a write at host D is attempted. The data written at host D may be tagged with a hint suggesting which host 130 should have received and written the data (e.g., host C), so that at some later time host D may forward the data to host C. In FIG. 14B, when host C is healthy, a data hand-off is made and the data is copied back to host C. The data is thus migrated back to host C, which is one of the N highest-ranked hosts in the preference list 190.

In an exemplary embodiment, related techniques may be used to restore lost copies of data sets. For example, when hosts 130 enter or leave and there is a corresponding change in the preference lists 190 which may cause data to become misplaced. For example, a host 130 added to system 100 will displace the rankings of other hosts 130 in preference lists 190. In such situations, to implement a data hand-off, pairs of hosts 130 may periodically perform a comparison of ranges they share in common, and then perform necessary data transfers to reconcile any differences detected during the comparison. For example, a host (the sender) holding a range of keys for which it is not one of the top N hosts may choose any one of the top N hosts at random (the receiver). As another example, the host may choose a host in the top N hosts that is unlikely to have the data, for example, because the host recently joined the data set service 112. The two hosts 130 may then proceed with a low-level database comparison within that range, and the sender may forward any data sets that are more recent than what the receiver is storing to reconcile any differences that are detected by the comparison. The data may migrate to at least one host 130 in the preference list 190 and then be propagated to remaining hosts 130 in the preference list 190. For example, the propagation to the remaining hosts 130 may be implemented by comparing data sets stored at pairs of hosts 130 that are within the top N hosts in the preference lists 190 for some set of keys. In an exemplary embodiment, Merkle trees may be used to efficiently find set differences between the data stored at two hosts. For example, a Merkle tree may be used in which each node of the tree contains a summary (or hash value) computed over the data in its subtree, and in which the leaves contain hashes of one or more data values (e.g., keys, versions, and clocks). Differences in the contents of the trees may be found by recursing down branches along which the data summaries (hash values) differ. To improve the efficiency of the comparison, the Merkle tree may be encoded using a Bloom filter.

Using the above-described mechanisms, the data set service 112 makes an ongoing attempt to dynamically migrate copies of the most recent versions of data sets to the top N hosts in their preference lists 190. Thus, even though copies of the most recent version of a dataset may initially be copied at hosts 130 which are lower in its preference list 190, or may for another reason become lost at one of the top N hosts, the copies eventually migrate back to the top N hosts in the preference lists 190, resulting in eventual consistency of the data set at the top N hosts.

Figure 15A:
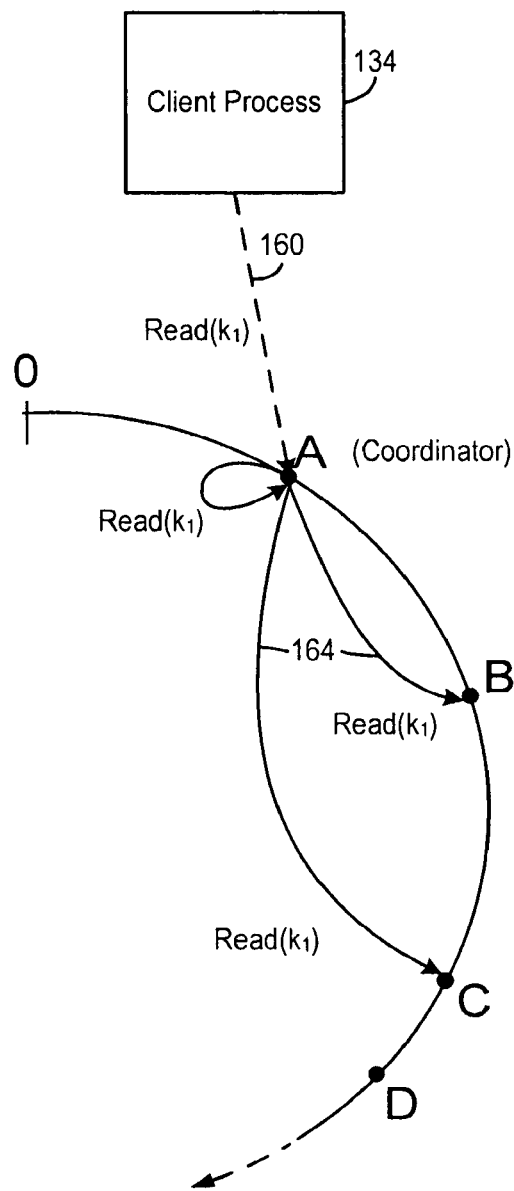
FIGS. 15A-15B are flowcharts of a read operation implemented by the system of FIG. 1 according to an exemplary embodiment.
Figure 15B:
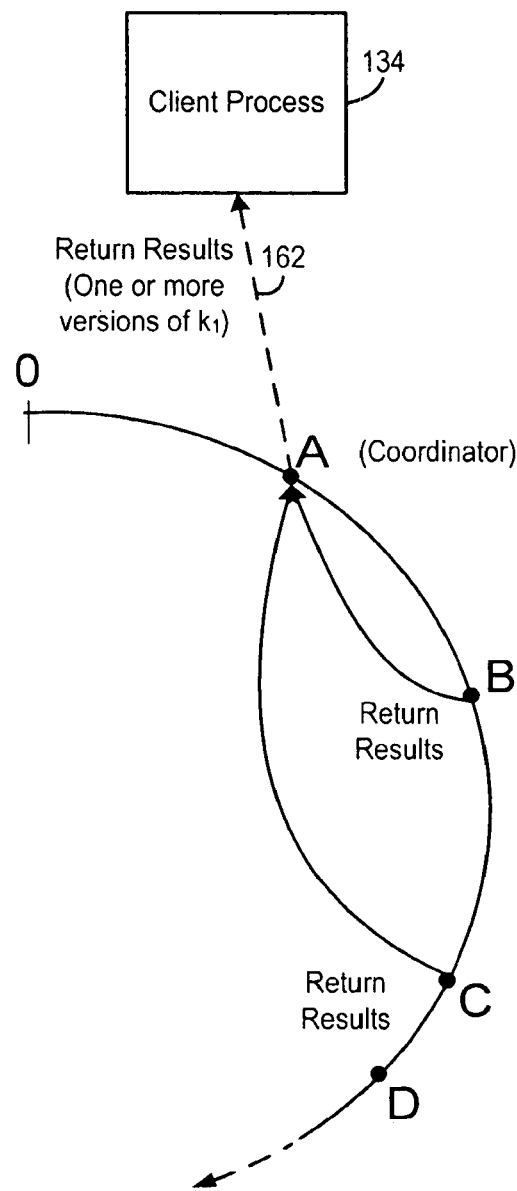

Referring to FIGS. 15A-15B, an example read operation 148 performed using preference list 190 is shown. In FIG. 15A, a read request is received by host A from client process 134 (either directly or indirectly, as described above) (step 160). Host A coordinates the read operation by requesting data from B and C in parallel to doing a local read. Hosts B and C perform the requested read operation. In FIG. 15B, host A receives read results from hosts B and C (step 162), and provides a response to client process 134 (step 164).

When receiving a read request, a coordinator may request all existing versions of data for that key from the N highest-ranked reachable hosts 130 in the preference list 190 for that key, and then wait for R responses before returning the result to the client process 134 (where R is the number of hosts that needed to participate in a successful read operation). In the example of FIGS. 15A-15B, the value R is set equal to three.

Like the value W, the value R is configurable. For example, if R=1, then once host A responds with a successful read, the data from that read is returned to the client process 134 for use. As another example, if R=2, then data may not be returned until reads are performed on both hosts A and B. Upon performing the two reads, system 100 realizes that the data is the same version and return the same data as when R=1. As yet another example, if R=3, then data may not be returned until reads were performed on hosts A, B, and C.

The values R and W may be configured to be less than N to provide consistent and high performance. Setting the values R and W such that R+W>N yields a quorum-like system in which there is a configurably high probability of overlap between the set of hosts 130 that participate in read and write operations. The higher N is set, the more likely the system is to have availability and durability because the chances that at least one replica exists is high. On the other hand, it may be noted that data need not be written to and read from the same set of hosts 130. For example, a data set may be written to hosts 130 which are further down on the preference list 190, migrated through data hand-off to hosts 130 that are higher on the preference list 190, and then ultimately read from the hosts 130 that are higher on the preference list 190. Eventual consistency of the data set at the top N hosts in the preference list 190 is achieved. In another exemplary embodiment, R and W may be configured to be much smaller than N (e.g., such that R+W<N), and copies of the data set may be sent only to W−1 hosts (in addition to the coordinator). In such an embodiment, the above-mentioned data repair mechanisms may be used to propagate the data set to remaining ones of the top N hosts.

In an exemplary embodiment, the application programming interface for the data set service 112 may be configured as follows. For example, the commands may have the following form:

write(Key,Value,Context)→ResultCode.

read(Key)→ValueList,Context,ResultCode where Key is an unbounded sequence of bytes, Value is an object comprising data (an unbounded sequence of bytes) and metadata (a read-only, arbitrary, extensible data set containing information about the value, including the last time the value was written, diagnostic and debugging information, and so on); ValueList is a list of values; Context is opaque object used internally by the storage system to track vector clock state for the read-modify-write cycle; and ResultCode is a code indication whether a read or write operation was successful.

The write operation changes the value identified by the key to the value specified by the Value parameter, unless the Context is stale, meaning that an intervening write has already occurred on that key. In an exemplary embodiment, the client process 134 restarts the read-modify-write cycle (optimistic locking). In another exemplary embodiment, the client process 134 may permit the write operation to continue, in which case there may be conflicting versions of the data set. The read operation performs a lookup in the data set service 112 for value(s) associated with the key. Any and all values that are successfully read are returned in the ValueList. An opaque Context object is returned for use in a subsequent update operation. If multiple values are returned, the client process 134 is expected to perform a reconciliation operation for all of the values. If a subsequent update is performed (using the returned Context), the assumption is that the updated value is a represents a reconciliation of all values returned in the value list, plus any additional changes to the value (if any).

As will be appreciated, a greater or lesser level of complexity in the application programming interface may be used. For example, in an exemplary embodiment, the Value object may include a type parameter that permits information concerning how long data should be maintained to be specified, e.g., so that old/abandoned data may eventually be deleted.

In another exemplary embodiment, a key may be used that is divided into two parts: (partition-key, object-key). In such an embodiment, the partition-key may be hashed to generate the preference list 190 for the key, as described above for the key parameter. Two data sets sharing the same partition-key may therefore have the same preference list 190, and hence with very high probability their respective copies of data sets would reside on the same set of hosts 130. Such a scheme allows accessing several data-sets together as an optimization, since the same set of hosts is in the top N hosts of the preference 190 lists for all the keys that share a partition-key. For example, in the merchant website example of FIG. 2, it may be desirable to store all data sets that relate to a particular user (e.g., shopping cart, profile, credit-card information, and so on) on the same set of hosts 130. By using the same partition-key for each of these data sets, the data sets are stored on the same set of hosts 130. The (partition-key, object-key) combination uniquely identifies each individual data set for the user. Another optimization made possible by this arrangement is range queries on keys sharing a partition-key. For example, such range queries may be used to iterate through all object-keys for a given partition-key, by accessing a single host 130 that is in the top N of the preference list 190 for that partition-key.

In another exemplary embodiment, a type parameter may be added to the write command (e.g., write(Key, Value, Context, Type)→ResultCode), so that a client process 134 may specify the type of data that is being written. The data set service 112 may be configured to delete data a certain amount of time after it is last accessed (e.g., in order to reclaim storage space when data is no longer needed). The time allowed before deletion may be based on the type of data. The type may also be used to decide the number of copies of the data that the data set service 112 should store (e.g., on the basis that some types of data may be more critical than others).

In another exemplary embodiment, a read context may also be passed as input to the read command (e.g., read(Key, Context)→ValueList, Context, ResultCode). In such an embodiment, the read context passed as input to the read command may be obtained as a result of a previous read. By passing it back as input to a read operation, a client process 134 may indicate interest in retrieving the specific version of the data set that was accessed during the previous read operation. As will be appreciated, other variations on the application programming interface are also possible.

III. Data Versioning in Exemplary System

A. Operation of Vector Clocks

Figure 16:
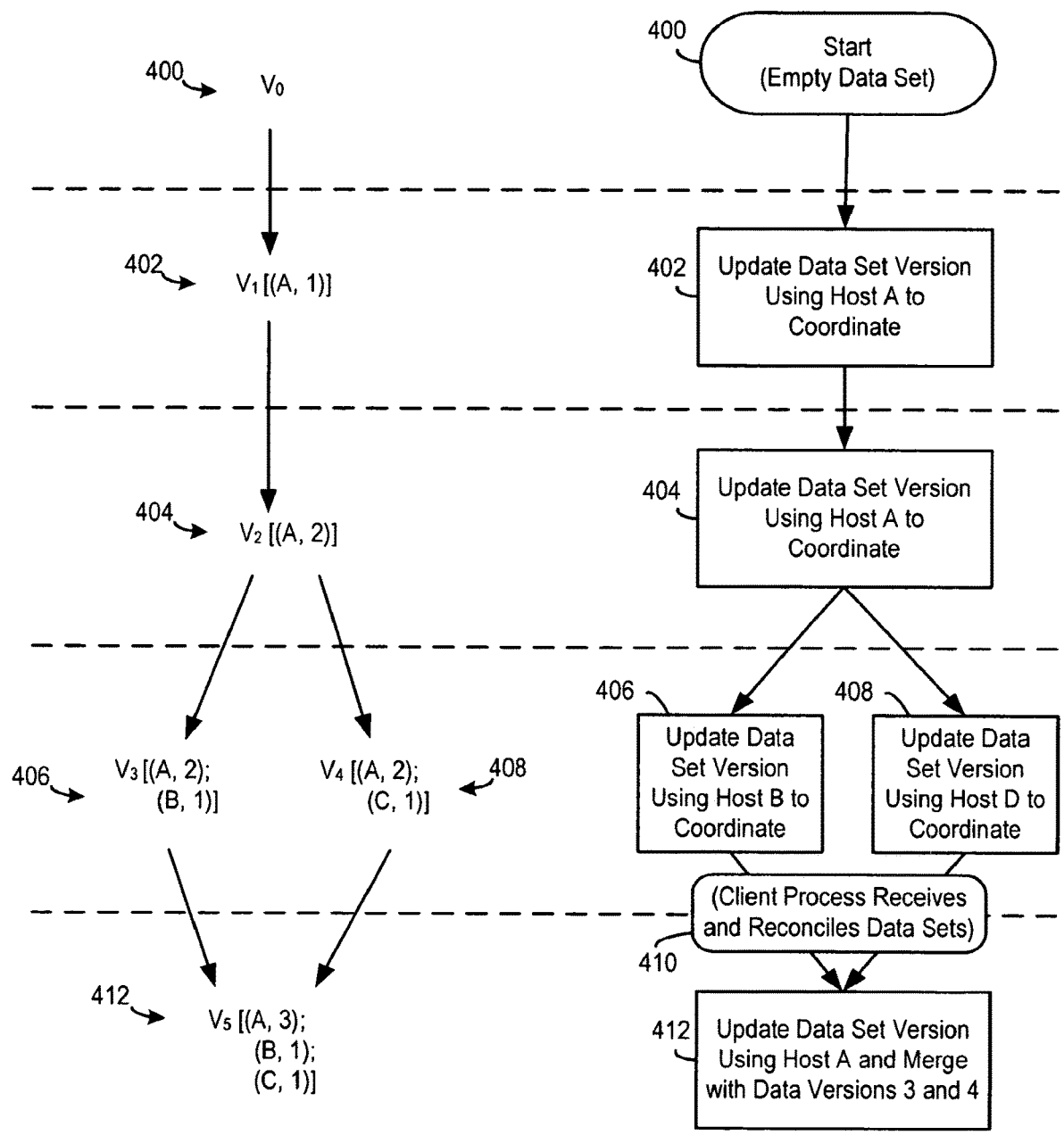
FIG. 16 is a flowchart of a data versioning arrangement used in the system of FIG. 1 according to an exemplary embodiment.

Referring to FIG. 16, an exemplary data versioning arrangement is discussed. As previously indicated, in order to provide high availability, the data set service 112 permits multiple versions of the same data to be present at the same time on different hosts 130. An ongoing attempt is made to migrate copies of the most recent versions of data sets to the top N hosts in their preference lists 190, however, this process is not instantaneous. Before the migration occurs, copies of older versions of a data set may be in existence at various hosts in its preference list 190, even at hosts 130 that are at or near the top of the preference list 190. Thus, for example, one host 130 may have one version reflecting temporarily lost old changes and another host 130 may have another version reflecting new changes made while the old changes are unavailable.

In an exemplary embodiment, it is desirable to be able to determine whether two copies of the same data set are different versions of the data set and have differences relative to each other. It is also desirable to be able to assess those differences, such that it is possible to distinguish situations in which two versions have an ancestor-descendant relationship with each other (e.g., one version is merely outdated and has been incorporated into the other version) from situations in which two versions are in conflict (e.g., each version contains data that is not reflected in the other version).

In an exemplary embodiment, a version history is stored with each copy of a data set. For example, the version history may be stored in the form of vector clocks which capture causality relations between different versions of the same data set. The vector clocks may concisely store enough information about the version history of the data set to permit a determination whether two versions are in conflict. In an exemplary embodiment, the vector clock comprises a list of {host ID, counter} pairs associated with the versions of data sets. The host ID value indicates the host that coordinated the write operation. The counter value indicates the number of times that host has written to the data set. The counter value encodes causality information for a data version, that is, a summary of what changes preceded that version.

When trying to determine whether two versions of a data set have a causal ordering (and hence one can be forgotten) or are on parallel branches (and hence need reconciliation), it is enough to examine their vector clocks. If one has greater-or-equal counter values for all the host-IDs in the other's vector clock, then the former is a descendant of the latter, and the latter can be forgotten. Thus, the vector clocks permit client processes 134 to reconcile multiple versions of the same data in order to collapse multiple branches of data evolution back into one.

FIG. 16 illustrates an example of data versioning as may be used by data set service 112. Initially, at step 400, the data set is empty. At step 402, a client process 134 updates empty data version $V_0$ using host A. Host A, which coordinates the write, copies the clock of the previous version and increases the counter value associated with host A and creates the vector clock for data version $V_1$. In this case, the counter is incremented to one since this is the first update. Data set service 112 stores data version $V_1$ and its associated vector clock [(A, 1)], e.g., host A performs a local write operation and further sends the new version (along with the new vector clock) to hosts B and C to perform additional local write operations and store additional copies. In one example embodiment where data set service 112 stores shopping cart information within a merchant website system, this update may have occurred due to a visitor adding an item to a shopping cart. As will be appreciated, what constitutes a new "version" of the data set may vary depending on the application.

In FIG. 16, the coordinator is one of the N highest ranked reachable hosts in the preference list 190. As indicated above, the coordinator may also be a host 130 that is not one of the N highest ranked reachable hosts in the preference list 190. In such an example, when receiving a write request, the coordinator may choose one of the N highest-ranked reachable hosts 130 in the preference list 190 for that key to generate a vector clock for the new version and store the new version locally. The coordinator may then send the new version (along with the new vector clock) to the remaining N highest-ranked reachable hosts, as previously described.

At step 404, the same client process 134 updates data version $V_1$ using host A. The host A, which coordinates the write, copies the clock of the previous version and increases the counter value associated with host A to two and creates the vector clock for data version $V_2$. Again, host A forwards the data version $V_2$ and its associated vector clock [(A, 2)] to hosts B and C for local write operations and store additional copies. Version $V_2$ descends from version $V_1$ and therefore over-writes version $V_1$, however there may be replicas of version $V_1$ lingering at host partitions that have not yet seen version $V_2$.

At step 406, the same process updates data version $V_2$ using a host B to coordinate the request. For example, host A may be unavailable. Since a new host B coordinates the update, a new vector clock entry is created associated with this host B with a counter value of one. Data set service 112 stores data version $V_3$ and the associated clock [(A, 2);(B, 1)]. The vector clock for data version $V_2$ may also be stored, if desired, in order to maintain version history or to allow more complex reconciliations to be performed. After step 406, a host that is aware of version $V_1$, but not of version $V_2$, may receive version $V_3$ and the associated vector clock. The host can determine by comparing the respective clocks [(A, 1)] and [(A, 2);(B, 1)] of version $V_1$ and version $V_3$ that version $V_1$ causally precedes version $V_3$ and hence that it was meant to be overwritten by version $V_3$. If, on the other hand, a different sequence of events has occurred, and a vector clock for data version $V_3$ has less-than-or-equal counters for all of the hosts in the clock of version $V_1$, then version $V_3$ is an ancestor of version $V_1$ and can be removed.

At step 408, a different client process 134 reads version $V_2$ and tries to update it using host C. For example, hosts A and B may be unavailable. In the present example, it is assumed that host C was not involved in the write operation of step 406, and is not aware of version $V_3$. Since a new host C coordinates the update, a new vector clock entry is created associated with this host C with a counter value of one. Data set service 112 stores data version $V_4$ and the associated clock [(A, 2);(C, 1)]. After step 408, a host that is aware of version $V_1$ or version $V_2$ could determine, upon receiving version $V_4$ and the associated vector clock, that version $V_1$ and version $V_2$ are over-written by the new data and can be removed.

At step 410, a client process 134 reads both version $V_3$ and version $V_4$. For example, the read operation may be coordinated by host A and may also involve hosts B and C. Host A obtains its own copy of the data set with vector clock [(A, 2)], the copy of the data set from host B with vector clock [(A, 2); (B, 1)], and the copy of the data set from host C with vector clock [(A, 2); (C, 1)]. The context of the read is a summary of the clocks of version $V_3$ and version $V_4$, namely [(A, 2);(B, 1);(C, 1)]. Host A will find that there is no causal relation between version $V_3$ and version $V_4$ because, from an examination of the vector clocks, there are changes in each of version $V_3$ and version $V_4$ that are not reflected in the other. The versions $V_3$ and $V_4$ are then reconciled.

In an exemplary embodiment, the data set service 112 (host A, in this example) provides the multiple versions to client process 134 (and/or version reconciliation logic 136 associated with client process 134), which in turn decides how to perform the reconciliation. This arrangement permits any business logic that is used to perform the reconciliation to be stored or associated with the client process 134 rather than with the data set service 112. Although client process 134 and version reconciliation logic 136 are shown as being separate, it will be appreciated that client process 134 and version reconciliation logic 136 may be provided in integral fashion. In another exemplary embodiment, the version reconciliation logic 136 may be provided with the data set service 112. The multiple versions may be reconciled by, for example, using a default ordering on the versions to decide which one to keep, by merging the different versions to produce a single reconciled version, by performing an analysis of the data and determining how to treat discrepancies on a discrepancy-by-discrepancy basis, and so on. As will appreciated different approaches may be more optimal in different situations, depending on the application.

At step 412, a write request is received from client process 134. Host A coordinates the write and updates the corresponding counter value in the vector clock. The updated version may also include other changes implemented by client process 134, unrelated to the reconciliation operation. New version $V_5$ will have the vector clock [(A, 3);(B, 1);(C, 1)].

It may be noted that, at step 412, host A updates the counter number to [(A, 3);(B, 1);(C, 1)], regardless whether any changes are implemented to the data set in addition to the reconciliation. No single version exists with the vector clock [(A, 2);(B, 1);(C, 1)], so updating the counter in the vector clock distinguishes the parent clock from the new clock. Additionally, increasing the counter is desirable because multiple client processes may attempt to reconcile at the same time (e.g., using different hosts to coordinate) but arrive at different results (e.g., because of different merge logic, because they added changes as well as reconciling, and so on). If the counter is not updated, the different merge attempts may be assigned the same clock, i.e., [(A, 2);(B, 1);(C, 1)], and hence be indistinguishable from each other.

B. Vector Clock Information and Truncation

In an exemplary embodiment, rather than comprising only {host ID, counter} pairs, the vector clock comprises a number of additional values and has the following form:

Vector Clock={(<Host ID><host-gen><key-gen>), <counter>,<time-stamp>}

The host ID is a unique identifier for a host and the counter parameter encodes the causality information for a data version, and corresponding to the {host ID, counter} pair described previously. In an exemplary embodiment, the combination of the (<Host ID> <host-gen> <key-gen>) parameters operates in the manner described previously with regard to the host ID alone. That is, a host is considered a different host (i.e., no causal relation between different versions of a data set may be implied) if any one of the three parameters (<Host ID> <host-gen> <key-gen>) is different.

In an exemplary embodiment, hosts 130 do not write vector clocks synchronously to disk. Hence, the potential exists that a host may forget the sequence numbers it generated for each key and consequently reuse the sequence numbers, thereby compromising the consistency of the vector clocks. When the risk of forgetting (e.g., after host failure) is identified, a host 130 updates its <host-gen> parameter so that for all future vector clocks it generates (for any key), it appears to be an entirely different host. Thus, incrementing the <host-gen> parameter upon rebooting the host 130 permits vector clocks generated prior to failure to be distinguished from vector clocks generated after rebooting. As will be appreciated, the counter for each vector clock is monotonically increasing in an unbounded fashion. In an exemplary embodiment, in order to avoid unbounded counter numbers, each host is periodically forced to choose a new unique identity, e.g., by incrementing the <host-gen> parameter. For example, a host be assigned a new unique identity after rebooting, thereby also zeroing the <counter> parameter. This causes the highest possible counter value to be bounded by the number of writes that a single host 130 can coordinate before changing identity. In another exemplary embodiment, an identity change may be triggered automatically in a host if one or more of its counter values reaches a predetermined threshold value.

The <key-gen> parameter may be used to track a key generation counter. In an exemplary embodiment, after data hand-off, hosts 130 delete any data that was obtained. This saves storage capacity for hosts 130 that are lower down on the preference list 190. At the same time, the hosts 130 maintain the <key-gen> parameter, which is incremented after data hand-off, thereby preventing any causal relationship being assumed the next time the host 130 is asked to perform a write operation. For example, if host D coordinates a write operation for version of a data set having a vector clock [(A, 3), (D, 1)], performs a data hand-off, and later is asked to coordinate another write operation for a version of the data set having a vector clock [(A, 2)], it would be inappropriate for the updated data set to have a vector clock [(A, 3), (D, 2)]. By assigning a new <key-gen> value in this situation, the host 130 is made to appear like a new host, thereby avoiding the appearance of causality between the two versions. In an exemplary embodiment, each host 130 maintains a separate <key-gen> per key and remembers the key generation for every key for which it generated a vector clock since it last changed identity (e.g., changed <Host ID> or updated its <host-gen>). Likewise, each host 130 may also remember the last <counter> parameter used in a vector clock for the key since either the corresponding <key-gen> parameter or <host-gen> parameter was updated.

The <time-stamp> parameter may be used to monitor the age of the data set and entries in its vector clock. In some applications, it is desirable to delete data if the data exceeds a predetermined age. For example, in a shopping cart application, it may be desirable to delete a shopping cart that has gone abandoned for a period of days, weeks, months or years, and so on. The time-stamp may be used to support the deletion of data sets in this manner. Additionally, the time-stamp may also be used for vector clock truncation. As will be appreciated, as the length of the list of different hosts (or same hosts with different <host-gen> or <key-gen> parameters) that have coordinated a write operation in connection with a data set increases, the length of the vector clock for that data set increases (i.e., because the length of the list of {host ID, counter} pairs contained in the vector clock increases). Accordingly, using the time-stamp, vector clocks that have aged by a predetermined amount may be deleted or truncated.

In other exemplary embodiments, rather than using vector clocks, other version history mechanisms may be used to track the changes in data sets. For example, hash histories may also be used. Herein, the term "version history" refers to any data structure that may be used to track changes in a data set over time (i.e., to track that changes exist, not necessarily to track the nature of the changes). As may be appreciated, different version history mechanisms may provide different tradeoffs in terms of disk space usage, bandwidth, maintaining consistency when deleting old versions, speed and ease in detecting causal precedence, and so on. In an exemplary embodiment, a version history mechanism is used which permits the detection of causal precedence (or the absence thereof, previously referred to as a conflict) between two or more copies of a data set. The version history mechanism may be used to allow version conflicts to occur (availability) without the loss of data and to facilitate maintaining consistency as data migrates to hosts that are highest in preference lists.

The invention is described above with reference to drawings. These drawings illustrate certain details of specific embodiments that implement the systems, methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Accordingly, the user computers 102 depicted in FIG. 1 may include, but are not limited to, desktop computers, laptop computers, set-top boxes, personal digital assistants, cellular telephones, media players, web pads, tablets, etc. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. It should also be noted that the word "engine" as used herein and in the claims is intended to encompass implementations using one or more lines of software code, and/or hardware implementations, and/or equipment for receiving manual inputs. Components such as engines, interfaces, databases, browsers, and so on, may be in communication with each other either because such components are provided in integral fashion because they are in communication with each other through a communication link, such as a network, and/or for other reasons.

The foregoing description of embodiments of the invention have been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. A system, comprising:
   a distributed data store comprising a plurality of computing devices comprising respective hardware processors and memory and configured to implement a plurality storage hosts that store a plurality of data sets for the distributed data store, wherein individual ones of the storage hosts are assigned to a plurality of different hash value ranges of a set of hash values mapped to different ones of the data sets;
   the distributed data store, configured to:
      receive an access request over a network for one of the data sets stored in the distributed data store from a client of the distributed data store, wherein the access request identifies a key associated with the data set, wherein the access request is a request to perform a write operation to modify data in the data set;
      generate a hash value for the data set based, at least in part, on the identified key according to a hash function for identifying storage hosts that store versions of the data sets;
      identify a first storage host of the storage hosts that stores a first version of the data set to service the access request that is assigned to a first hash value range of the hash value ranges that includes the hash value for the data set;
      from a second hash value range of the hash value ranges that is determined to be successive to the first hash value range in an order for selecting hosts from the hash value ranges, select a second storage host of the storage hosts that stores a second version of the data set, wherein the second storage host is assigned to the second hash value range;
      direct the access request to the data set to be performed at both the first storage host and the second storage host before returning a response for the access request over the network to the client; and
      wherein the selection of the second storage host of the storage hosts that stores the second version of the data set is performed as part of an identification of a number of storage hosts including the second storage host such that the write operation is successfully completed in satisfaction of a write quorum requirement before returning the response.

2. The system of claim 1, wherein a number of hash value ranges assigned to one of the storage hosts is different than another number of hash value ranges assigned to another one of the storage hosts.

3. The system of claim 1, wherein to select the second storage host of the storage hosts that stores the second version of the data set, the distributed data store is configured to exclude from consideration those hash value ranges successive to the first hash value range that are also assigned to the first storage host.

4. The system of claim 1, wherein the distributed system is further configured to:
   receive an access request for another one of the data sets stored in the distributed data store, wherein the access request identifies another key associated with the other data set;
   generate another hash value for the other data set based, at least in part, on the identified other key according to the hash function for identifying storage hosts that store versions of the data sets;
   identify the first storage host that stores a first version of the other data set to service the access request, wherein the first storage host is assigned to a third hash value range of the hash value ranges that includes the other hash value for the other data set, wherein the third hash value range is different than the first hash value range;
   from fourth hash value range that is successive to the third hash value range, select a third storage host of the storage hosts that stores a second version of the other data set, wherein the third storage host is assigned to the fourth hash value range, wherein the third storage host is different than the second storage host; and
   perform the access request to the other data set at the first storage host and the third storage hosts.

5. The system of claim 4, wherein the access request for another one of the data sets is a request to perform a read operation to read data in the other one of the data sets, and wherein the selection of the third storage host of the storage hosts that stores the second version of the other one of the data sets is performed as part of an identification of a number of storage hosts including the third storage host such that the read operation is successfully completed in satisfaction of a read quorum requirement before returning a response to the access request for another one of the data sets.

6. A method, comprising:
   performing, by a plurality of computing devices:

maintaining plurality of data sets at a plurality of storage hosts implemented as part of a distributed data store, wherein individual ones of the storage hosts are assigned to a plurality of different hash value ranges of a set of hash values mapped to different ones of the data sets;

receiving an access request for one of the data sets stored in the distributed data store from a client of the distributed data store over a network, wherein the access request identifies a key associated with the data set, wherein the access request is a request to perform a write operation to modify data in the data set;

generating a hash value for the data set based, at least in part, on the identified key according to a hash function for identifying storage hosts that store versions of the data sets;

identifying a first storage host of the storage hosts that stores a version of the data set to service the access request that is assigned to a first hash value range of the hash value ranges that includes the hash value for the data set;

from a second hash value range of the hash value ranges that is determined to be successive to the first hash value range in an order for selecting hosts from the hash value ranges, selecting a second storage host of the storage hosts that stores a second version of the data set, wherein the second storage host is assigned to the second hash value range;

directing the access request to the data set to be performed at both the first storage host and the second storage host before returning a response for the access request to the client over the network; and wherein the selection of the second storage host of the storage hosts that stores the second version of the data set is performed as part of an identification of a number of storage hosts including the second storage host such that the write operation is successfully completed in satisfaction of a write quorum requirement before returning the response.

7. The method of claim 6, wherein a number of hash value ranges assigned to one of the storage hosts is different than another number of hash value ranges assigned to another one of the storage hosts.

8. The method of claim 6, wherein said selecting the second storage host of the storage hosts that stores the second version of the data set comprises excluding from consideration those successive hash value ranges assigned to the initial storage host.

9. The method of claim 6, further comprising:
receiving an access request for another one of the data sets stored in the distributed data store, wherein the access request identifies another key associated with the other data set;

generating another hash value for the other data set based, at least in part, on the identified other key according to the hash function for identifying storage hosts that store versions of the data sets;

identifying the first storage host that stores a first version of the other data set to service the access request that is assigned to a third hash value range of the hash value ranges that includes the other hash value for the other data set, wherein the of the other data set, wherein the third storage host is different than the second storage host; and performing the access request to the other data set at the first storage host and the third storage host.

10. The method of claim 9, wherein the access request for another one of the data sets is a request to perform a read operation to read data in the other one of the data sets, and wherein said selecting of the third storage host of the storage hosts that stores the second version of the other one of the data sets is performed as part of an identification of a number of storage hosts including the third storage host such that the read operation is successfully completed in satisfaction of a read quorum requirement before returning a response to the access request for another one of the data sets.

11. The method of claim 6, wherein the different hash value ranges are assigned to the storage hosts according to respective preference lists of storage hosts for accessing the data sets.

12. A non-transitory, computer-readable storage medium, storing program instructions that when executed by a plurality of computing devices cause the plurality of computing devices to implement:

maintaining plurality of data sets at a plurality of storage hosts implemented as part of a distributed data store, wherein individual ones of the storage hosts are assigned to a plurality of different hash value ranges of a set of hash values mapped to different ones of the data sets;

receiving an access request for one of the data sets stored in the distributed data store from a client of the distributed data store over a network, wherein the access request identifies a key associated with the data set, wherein the access request is a request to perform a write operation to modify data in the data set;

generating a hash value for the data set based, at least in part, on the identified key according to a hash function for identifying storage hosts that store versions of the data sets;

identifying a first storage host of the storage hosts that stores a first version of the data set to service the access request that is assigned to a first hash value range of the hash value ranges that includes the hash value for the data set;

from a second hash value range of the hash value ranges that is determined to be successive to the first hash value range in an order for selecting hosts from the hash value ranges, selecting a second storage host of the storage hosts that stores a second version of the data set, wherein the second storage host is assigned to the second hash value range;

directing the access request to the data set to be performed at both the first storage host and the second storage host before returning a response for the access request to the client over the network; and wherein the selection of the second storage host of the storage hosts that stores the second version of the data set is performed as part of an identification of a number of storage hosts including the second storage host such that the write operation is successfully completed in satisfaction of a write quorum requirement before returning the response.

13. The non-transitory, computer-readable storage medium of claim 12, further comprising additional program instructions to assign a different number of hash value ranges to one of the storage hosts than another number of hash value ranges assigned to another one of the storage hosts.

14. The non-transitory, computer-readable storage medium of claim 12, wherein, in said selecting the second storage host of the storage hosts that stores the second version of the data set, the program instructions cause the plurality of computing devices to implement excluding from consideration those successive hash value ranges assigned to the initial storage host.

15. The non-transitory, computer-readable storage medium of claim 12, further comprising additional program instructions that cause the plurality of computing devices to further implement:

receiving an access request for another one of the data sets stored in the distributed data store, wherein the access request identifies another key associated with the other data set;

generating another hash value for the other data set based, at least in part, on the identified other key according to the hash function for identifying storage hosts that store versions of the data sets;

identifying the first storage host that stores a first version of the other data set to service the access request that is assigned to a third hash value range of the hash value ranges that includes the other hash value for the other data set, wherein the of the other data set, wherein the third storage host is different than the second storage host; and performing the access request to the other data set at the first storage host and the third storage host.

16. The non-transitory, computer-readable storage medium of claim 15, wherein the access request for another one of the data sets is a request to perform a read operation to read data in the other one of the data sets, and wherein said selecting of the third storage host of the storage hosts that stores the second version of the other one of the data sets is performed as part of an identification of a number of storage hosts including the third storage host such that the read operation is successfully completed in satisfaction of a read quorum requirement before returning a response to the access request for another one of the data sets.

17. The non-transitory, computer-readable storage medium of claim 12, storing additional program instructions to assign the different hash value ranges to the storage hosts according to respective preference lists of storage hosts for accessing the data sets.

\* \* \* \* \*